United States Patent [19]

Mizuno

[11] Patent Number: 4,645,408

[45] Date of Patent: Feb. 24, 1987

[54] UNCONTROLLED ANGULAR DISPLACEMENT COMPENSATING DEVICE FOR INDUSTRIAL ROBOT

[75] Inventor: Kenji Mizuno, Kani, Japan

[73] Assignee: Mizuno Tekko Kabushiki Kaisha, Kani, Japan

[21] Appl. No.: 781,038

[22] Filed: Sep. 27, 1985

[51] Int. Cl.$^4$ .............................................. B66C 1/00
[52] U.S. Cl. .................... 414/733; 414/706; 414/709; 414/710; 901/21; 901/22; 901/26; 901/48
[58] Field of Search .............. 901/19, 21, 25, 26, 901/15, 22, 29, 48; 414/917, 700, 706, 709, 710, 714, 719, 733, 735

[56] References Cited

U.S. PATENT DOCUMENTS

| | | | |
|---|---|---|---|
| 1,786,608 | 12/1930 | Halstead | 414/733 |
| 3,463,329 | 8/1969 | Gartner | 901/21 X |
| 3,543,947 | 12/1970 | Devol | 414/733 |
| 3,850,307 | 11/1974 | Motoda | 901/21 X |
| 4,065,001 | 12/1977 | Ohnaka | 901/21 X |
| 4,551,058 | 11/1985 | Mosher | 414/917 X |

FOREIGN PATENT DOCUMENTS 60-25690  2/1985  Japan .

*Primary Examiner*—Joseph J. Rolla
*Assistant Examiner*—Jay I. Alexander
*Attorney, Agent, or Firm*—Wenderoth, Lind & Ponack

[57] ABSTRACT

An uncontrolled angular displacement compensating device for compensating an uncontrolled angular displacement of a robot hand mounted on a robot hand mounting link of a robot hand shifting linkage of an industrial robot, resulting from the expansion or contraction of the robot hand shifting linkage. The uncontrolled angular displacement compensating device comprises a pair of identical sprockets fixed to a first shaft supported on the free end of the robot hand mounting link and on a second shaft rotatably supported on the basal end of the same link, respectively, a driving bevel gear fixed to the first shaft, a driven bevel gear rotatably mounted on a robot hand mounting member pivotally joined to the free end of the same link and engaging the driving bevel gear, and an endless chain extended between the sprockets. The sprocket mounted on the second shaft is turned either clockwise or counterclockwise when the robot hand mounting link is turned either counterclockwise or clockwise as the robot hand shifting linkage is extended or contracted, so that the driving bevel gear is turned so as to compensate an angular displacement of the robot hand on its own axis caused by the expansion or contraction of the robot hand shifting linkage.

1 Claim, 5 Drawing Figures

UNCONTROLLED ANGULAR DISPLACEMENT COMPENSATING DEVICE FOR INDUSTRIAL ROBOT

BACKGROUND OF THE INVENTION

1. Field of the Invention

The present invention relates to an uncotrolled angular displacement compensating device for compensating an uncontrolled angular displacement of a robot hand mounted on an industrial robot of the linkage system in which the robot hand is shifted by means of a linkage and the robot hand is turned through an angle of 90 degrees or 180 degrees by the operating force of an actuator transmitted thereto through bevel gears mounted on a joining unit interconnecting the robot hand mounting link of the linkage and the robot hand, respectively.

2. Description of the Prior Art

In an industrial robot of such a system, the hand mounting link mounted with a robot hand turns relative to the robot hand when the robot hand shifting linkage is expanded or contracted, and hence one of a set of bevel gears mounted on the joining unit turns relative to the other. Consequently, the uncontrolled angular displacement of the robot hand from a correct position occurs, which makes the smooth attachment of a work to and removal of a work from the robot hand, and in the worst case, makes the attachment of a work to and the removal of a work from the robot hand impossible.

SUMMARY OF THE INVENTION

In an industrial robot of the linkage system in which the robot hand is shifted by a linkage and is turned through an angle of 90 degrees or 180 degrees by an actuator through bevel gears mounted on a robot hand mounting link of the linkage and on a robot hand mounting unit joined to the robot hand mounting link, respectively, the present invention provides an an uncontrolled angular displacement compensating device comprising sprockets having the same pitch diameter and the same number of teeth and fixedly mounted on a first shaft mounted with the driving bevel gear and on a second shaft supported on the robot hand mounting link at an appropriate position, respectively, an endless chain extended between the sprockets, a correction lever mounted at the basal end thereof on the second shaft so as to be rotatable and pivotally connected at the free end thereof to an auxiliary link of a horizontal position maintaining linkage, and a power cylinder for actuating the endless chain, pivotally connected at the rear end thereof through a connecting member to the correction lever and connected at the free end of the piston rod thereof through a connecting member to the upper run of the endless chain.

It is a first object of the present invention to compensate an uncontrolled angular displacement of the robot hand, necessarily resulting from the expansion or contraction of the robot hand shifting linkage.

It is a second object of the present invention to provide an uncontrolled angular displacement compensating device of a simple construction capable of achieving the first object of the present invention.

Other objects, features and advantages of the present invention will become apparent from the following description of a preferred embodiment of the invention taken in connection with the accompanying drawings.

BRIEF DESCRIPTION OF THE INVENTION

DESCRIPTION OF THE PREFERRED EMBODIMENT

First a robot hand shifting linkage 12 mounted with an uncontrolled angular displacement compensating device 10 of the present invention will be described.

Figure 1:
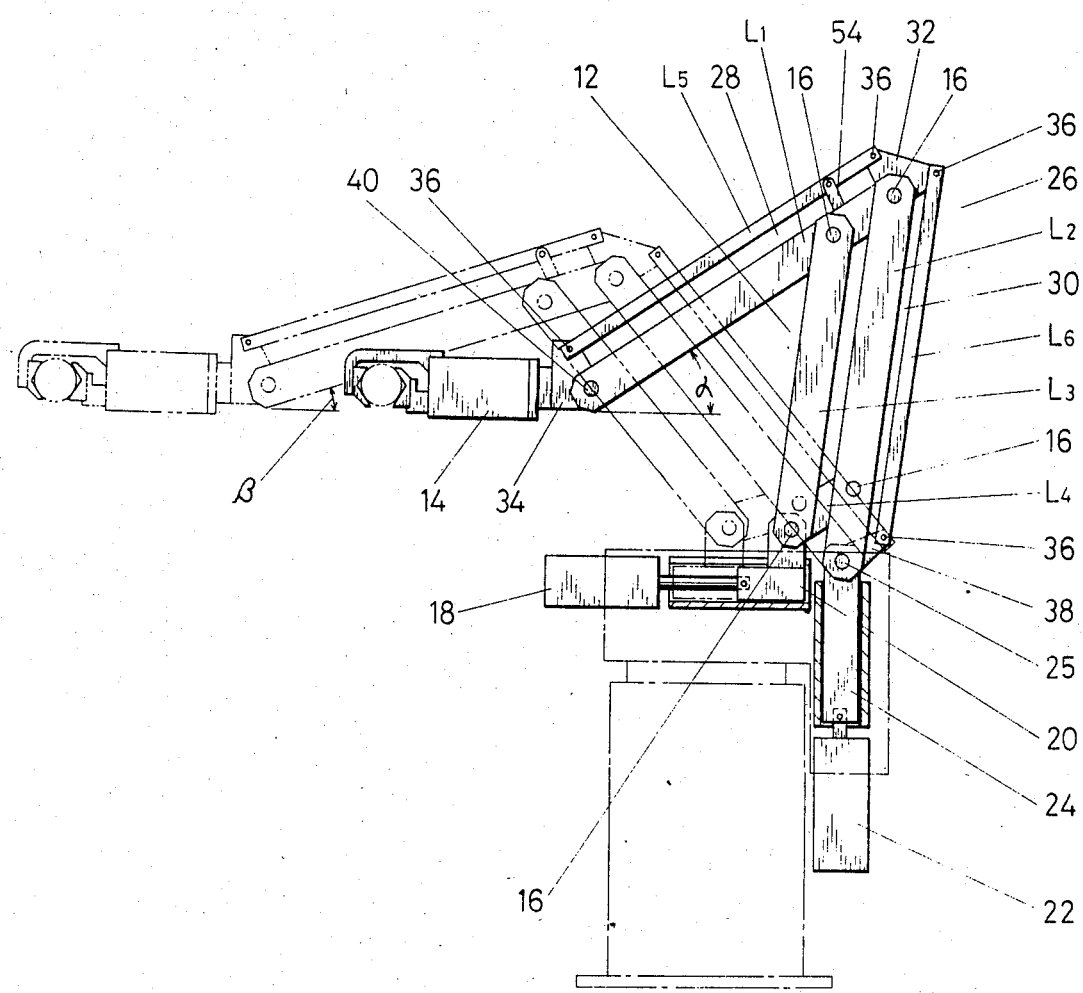
FIG. 1 is a side elevation of an industrial robot of the linkage system equipped with a robot hand shifting linkage 12 for shifting a robot hand 14.

Referring to FIG. 1, the robot hand shifting linkage 12 for shifting a robot hand 14 has four links $L_1$, $L_2$, $L_3$, and $L_4$ joined in the form of a parallelogram with joint pins 16. The joining parts of the links $L_3$ and $L_4$ are joined with the joint pins 16 to a first basal member 20 capable of being moved only in horizontal directions along a straight line by a horizontal-shifting cylinder 18, while the link $L_2$ is joined at the lower end thereof with a joint pin 25 to a second basal member 24 capable of being moved only in vertical directions along a straight line by a lifting cylinder 22. The link $L_1$ serves as a robot hand mounting link.

The robot hand shifting linkage 12 is provided with a horizontal position maintaining linkage 26 or maintaining the robot hand 14 attached to the free end of the link $L_1$ always in a horizontal position. The horizontal position maintaining linkage 26 comprises a first parallel linkage 28 and a second parallel linkage 30. An auxiliary link $L_5$ having the same length as that of the link $L_1$ is extended in parallel to the link $L_1$ and is joined to an intermediate bracket 32 joined to the joint between the links $L_1$ and $L_2$ with the joint pin 16 and to a mounting member 34 fixed to the rear end of the robot hand 14, with joint pins 36. Thus the first parallel linkage 28 comprises the links $L_1$ and $L_5$, the intermediate bracket 32 and the mounting member 34. An auxiliary link $L_6$ having the same length as that of the link $L_2$ is extended in parallel to the link $L_2$ and is joined with joint pins 36 to a bracket 38 fixed to the upper end of the second basal member 24 and to the intermediate bracket 32. Thus the second parallel linkage 30 comprises the links $L_2$ and $L_6$, the intermediate bracket 32 and the bracket 38.

The mounting member 34 is joined in a horizontal position to the respective free ends of the link $L_1$ and the auxiliary link $L_5$ with a first shaft 40 and the joint pin 36, respectively. The robot hand 14 is mounted on the mounting member 34 so as to be rotatable.

The uncontrolled angular displacement compensating device 10 of the present invention will be described hereinafter.

Figure 2:
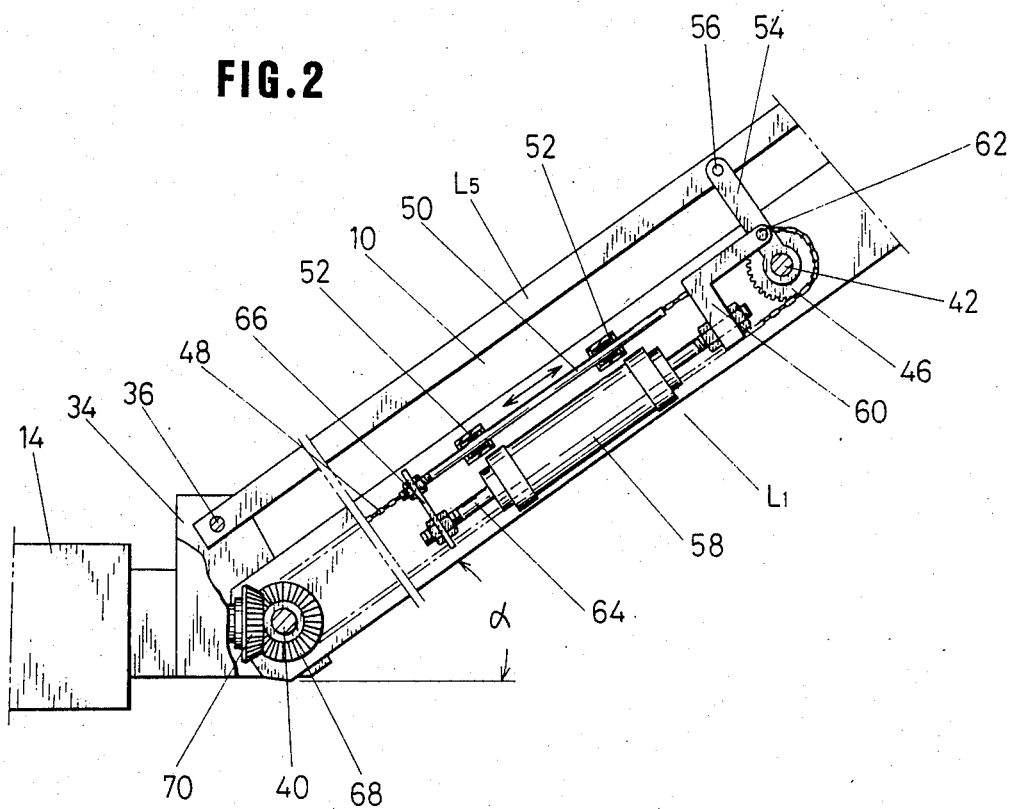
FIG. 2 is a side elevation of an uncontrolled angular displacement compensating device 10 according to the present invention.
Figure 3:
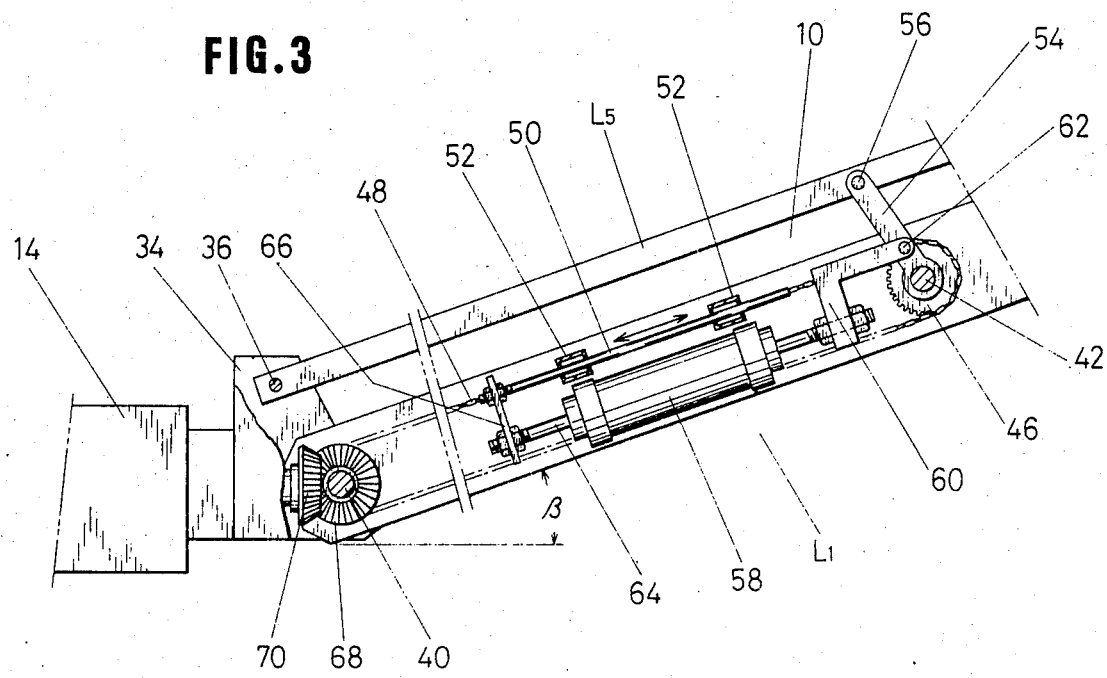
FIG. 3 is a side elevation of the uncontrolled angular displacement compensating device 10 of FIG. 2, in a state of operation different from that shown in FIG. 2.
Figure 4:
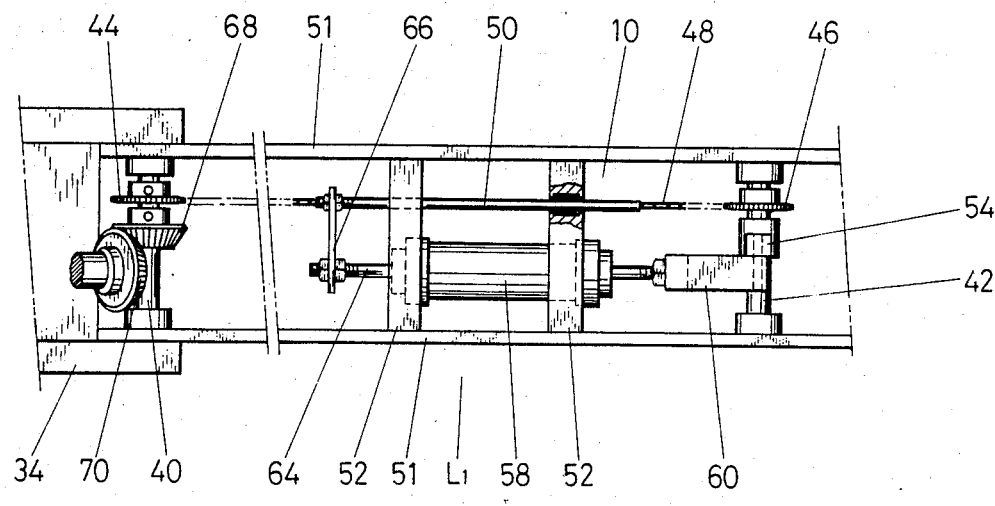
FIG. 4 is a plan view of the uncontrolled angular displacement compensating device 10 of FIG. 2.

Referring to FIGS. 1 to 3, a second shaft 42 is supported horizontally and in parallel to the first shaft 40 on the link L near the intermediate bracket 32. An endless chain 48 is extended between a sprocket 44 fixedly mounted on the first shaft 40 and a sprocket 46 rotatably mounted on the second shaft 42. The pitch diameters, hence the numbers of teeth, of the sprockets 44 and 46 are equal to each other. An operating rod 50 is incorporated into the upper run of the endless chain 48 to ensure power transmission. The operating rod 50 is inserted through and supported on operating rod guiding members 52 extended between the opposite side walls 51 of the link $L_1$ for sliding motion. A correction lever 54 is mounted rotatably at the basal end thereof on the second shaft 42 and is joined at the upper end thereof to the auxiliary link $L_5$ of the first parallel linkage 28 with a joint pin 56. The correction lever 54 is extended in parallel to a line segment extending between the first shaft 40 and the joint pin 36 joining the mounting member 34 to the first link $L_1$ and to the auxiliary link $L_5$, respectively.

Figure 5:
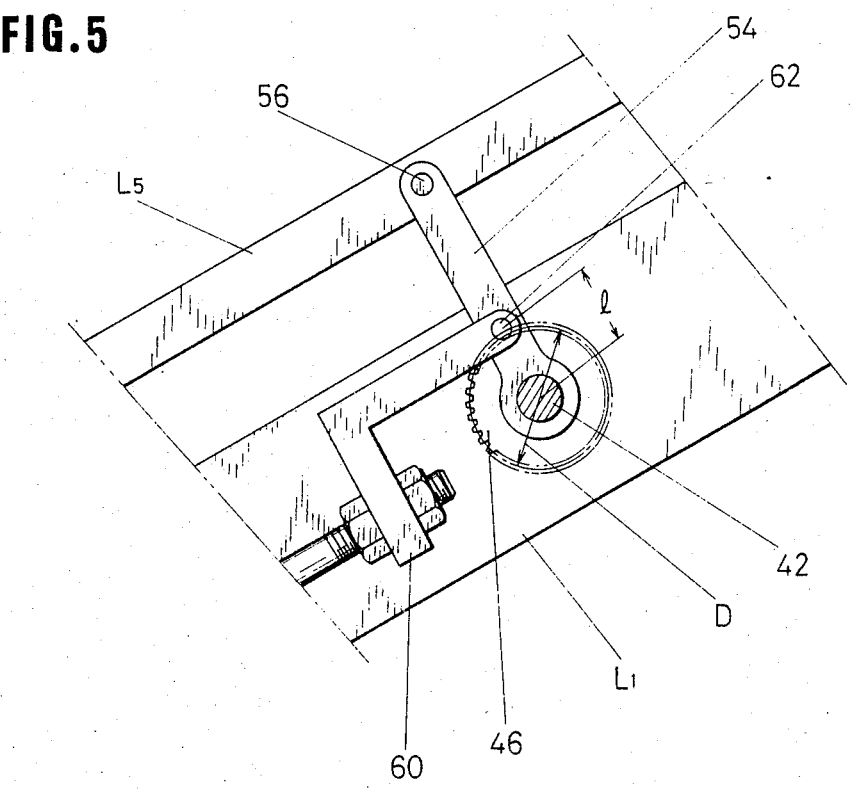
FIG. 5 is an enlarged view of an essential portion of the uncontrolled angular displacement compensating device 10 of FIG. 2.

A fluid pressure cylinder, for example a pneumatic cylinder (actuator) 58, is joined pivotally at the rear end thereof through a connecting member 60 to the correction lever 54 with a joint pin 62. The free end of the piston rod 64 of the pneumatic cylinder 58 and the operating rod 50 are interconnected with an connecting member 66. In FIGS. 2 and 5, the distance l between the center axis of the joint pin 62 joining the connecting member 60 and the correction lever 54 and the center axis of the second shaft 42 is slightly greater than the half of the pitch diameter D of the sprocket 46. Accordingly, when the robot hand shifting linkage 12 is expanded or contracted and thereby the correction lever 54 is turned through an angle accordingly relative to the link $L_1$, the endless chain 48 is moved through the connecting member 60, the pneumatic cylinder 58 and the connecting member 66, and thereby the sprockets 44 and 46 are turned through the practically the same angle as the angle of turning of the correction lever 54 in the direction of turning of the correction lever 54 relative to the link $L_1$.

The rotative movement of the first shaft 40 is transmitted through the driving bevel gear 68 fixedly mounted on the first shaft 40 and a driven bevel gear 70 engaging the driving bevel gear 68 to the robot hand 14.

The functions of the present invention will be described hereinafter. When only the horizontal-shifting cylinder 18 is actuated in a state shown by continuous lines in FIG. 1, the robot hand shifting linkage 12 is extended as illustrated by alternate long and two short dashes lines in FIG. 1 and the inclination of the link $L_1$ to a horizontal line is reduced.

Suppose that the inclination of the link $L_1$ of the linkage 12 to a horizontal line before extension is $\alpha$ and that of the same after extension is $\beta$. The link $L_1$ turns clockwise through an angle $(\alpha-\beta)$ relative to the robot hand 14 held in a horizontal position. If the uncontrolled angular displacement compensating device 10 of the present invention is not incorporated in to the link $L_1$, the driving bevel gear 68 fixed to the link $L_1$ turns clockwise throught an angle $(\alpha-\beta)$ relative to the robot hand 14, as the robot hand shifting linkage 12 extends. Consequently, the driven bevel gear 70 is turned, and thereby the robot hand 14 is turned relative to the link $L_1$.

However, since the uncontrolled angular displacement compensating device 10 of the present invention is incorporated into the link $L_1$, this uncontrolled angular displacement of the robot hand 14 is compensated by the uncontrolled angular displacement compensating device 10. That is, the inclination of the correction lever 54 to a horizontal line is always constant on the principle of the parallel linkage regardless of the extension or contraction of the robot hand shifting linkage 12. Accordingly, the correction lever 54 turns counterclockwise relative to the link $L_1$ through the angle $(\alpha-\beta)$ when the link $L_1$ turns clockwise relative to the robot hand 14 through the same angle. The turning of the correction lever 54 relative to the link $L_1$ is transmitted through the connecting member 60, the pneumatic cylinder 58 and the connecting member 66 to the operating rod 50 and causes the operating rod 50 to move along the axial direction thereof, and thereby the endless chain 48 turns the sprockets 44 and 46 counterclockwise. As mentioned above, the angular displacement of the sprockets 44 and 46 is practically the same as that of the correction lever 54 relative to the link $L_1$. Since the sprocket 44 and the driving bevel gear 68 are mounted fixedly on the first shaft 40, the driving bevel gear 68 is turned counterclockwise through the practically the same angle as the angle $(\alpha-\beta)$.

Accordingly, when the robot hand shifting linkage 12 is extended, the driving bevel gear 68 is turned clockwise relative to the robot hand 14 through the angle $(\alpha-\beta)$, while the same is turned counterclockwise relative to the link $L_1$ through the practically the same angle as the angle $(\alpha-\beta)$ by the agency of the uncontrolled angular displacement compensating device 10 of the present invention. Therefore, the angular displacements in opposite directions of the driving bevel gear 68 compensate each other, and hence the position of the driving bevel gear 68 relative to the robot hand 14 is kept unchanged. Consequently, any angular displacement of the robot hand 14 does not occur when the robot hand shifting linkage 12 is extended or contracted.

The manner of operation of the device to turn a work gripped by the robot hand 14, in which the endless chain 48 is actuated by the pneumatic cylinder 58 to turn the robot hand 14 through the vevel gears 68 and 70, is the same as that of the conventional device.

As apparent from the foregoing description, according to the present invention, the uncontrolled angular displacement of the robot hand during the extension or contraction of the robot hand shifting linkage is compensated by an uncontrolled angular displacement compensating device of an extremely simple construction and the smooth handling of a work gripped by the robot hand, such as turning of the work, is achieved.

What is claimed is:

1. An uncontrolled angular displacement compensating device for an industrial robot of a linkage type in which the robot hand is shifted by means of a linkage and the robot hand is turned through an angle of 90 degrees or 180 degrees through bevel gears mounted on a robot hand mounting link of the linkage and on a connecting member interconnecting the same link and the robot hand, respectively, said uncontrolled angular displacement compensating device comprising:
   (a) a first shaft fixedly mounted to a driving bevel gear;
   (b) a second shaft supported on said robot hand mounting link at a position spaced from said first shaft;
   (c) a pair of sprockets having the same pitch diameter and mounted on said first and second shafts, respectively;
   (d) an endless chain extended between said sprockets;
   (e) a correction lever rotatably mounted at the basal end thereof on said second shaft and pivotally joined at the free end thereof to an auxiliary link of a horizontal position maintaining linkage for maintaining the robot hand at a horizontal position; and (f) a fluid pressure cylinder pivotally joined at the rear end thereof through a connecting member to said correction link and connected at the free end of the piston rod thereof through a connecting member to the upper run of the endless chain.

* * * * *